US007360685B2

(12) United States Patent
Keohane et al.

(10) Patent No.: US 7,360,685 B2
(45) Date of Patent: *Apr. 22, 2008

(54) CONTROLLING ELECTRONIC WITHDRAWALS BY A WITHDRAWAL DEVICE

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

This patent is subject to a terminal disclaimer.

(21) Appl. No.: 10/960,561

(22) Filed: Oct. 7, 2004

(65) Prior Publication Data

US 2006/0080248 A1 Apr. 13, 2006

(51) Int. Cl.
*G06F 19/00* (2006.01)
(52) U.S. Cl. ...................... 235/379; 235/382
(58) Field of Classification Search ............... 235/379, 235/380, 382, 487, 492
See application file for complete search history.

(56) References Cited

U.S. PATENT DOCUMENTS 5,457,305 A * 10/1995 Akel et al. ................. 705/45
6,047,270 A * 4/2000 Joao et al. .................. 705/44
6,679,422 B2  1/2004 Brown et al.
6,871,288 B2 * 3/2005 Russikoff ................... 726/19
2002/0188842 A1* 12/2002 Willeby ..................... 713/154
2003/0208684 A1* 11/2003 Camacho et al. ........... 713/186

OTHER PUBLICATIONS

U.S. Appl. No. 10/718,093, filed Nov. 20, 2003, Rodriguez et al.
Automatic Teller Machine Check-Cashing Mechanism with Video Digitizing Camera; Jun. 1986; pp. 433-434; TDB; US.
Alert Pin for Personal Banking Terminals; May 1993; pp. 309-312; TDB vol. 36 n5; TDB; US.

* cited by examiner

*Primary Examiner*—Daniel St. Cyr
(74) *Attorney, Agent, or Firm*—John Biggers; Mark S. Walker; Biggers & Ohanian, LLP

(57) ABSTRACT

Controlling electronic withdrawals by a withdrawal device including creating in the withdrawal device a data structure representing a withdrawal request, where the data structure includes fields for a withdrawal device identifier, a drawer identifier, a drawee identifier, and a withdrawal amount; transmitting from the withdrawal device to a drawee a request for limitations on electronic withdrawals for the drawer, where the limitations include a limitation on drawer location; receiving in the withdrawal device from storage in computer memory of the drawee data representing the limitations on electronic withdrawals for the drawer, including the limitation on drawer location; and authorizing, by the withdrawal device, an electronic withdrawal in dependence upon the limitations, including the limitation on drawer location.

8 Claims, 7 Drawing Sheets

CONTROLLING ELECTRONIC WITHDRAWALS BY A WITHDRAWAL DEVICE

CROSS-REFERENCE TO RELATED APPLICATIONS

The present application is related to the following co-pending applications:
(1) U.S. patent application Ser. No. 10/960,560;
(2) U.S. patent application Ser. No. 10/960,566;

BACKGROUND OF THE INVENTION

1. Field of the Invention

The field of the invention is data processing, or, more specifically, methods, systems, and products for controlling electronic withdrawals by a withdrawal device.

2. Description of Related Art

Electronic withdrawals are typically effected through a withdrawal device such as an Automatic Teller Machine ('ATM') and Point-of-Sale ('POS') Terminals. An ATM is an electronic device that allows a customer to make cash withdrawals and check account balances at any time without the need for a human teller. Many ATMs also allow people to deposit cash or checks, transfer money between bank accounts, or even buy postage stamps. A 'Point-of-Sale' is a location where electronic withdrawals from customer accounts are performed with the customer present, such as a retail store. The customer typically presents a debit card or check card which is then read magnetically, and the customer's signature often is obtained as additional authentication and authorization for the transaction. A 'POS terminal' is the electromechanical equipment used to capture, transmit and store data implementing electronic withdrawals through debit card and check card transactions at the point of sale. In this specification, ATMs and POS terminals are referred to generally as 'withdrawal devices.'

Most major banks work with credit card companies to issue 'debit cards' or 'check cards.' Check cards effect electronic withdrawals in a format sometimes referred to as an 'electronic check' or 'echeck.' 'E-check' or 'electronic check' is a generic term for an electronic withdrawal from a customer account that is originated on the Internet, at a point of sale, over the telephone, or by a bill payment sent through the mail or dropped in an unattended dropbox. The terms 'echeck' and 'electronic check' are used to refer to several types of electronic transactions:

ACH-based electronic check. A payment that begins as a paper check is converted into, or truncated to, an ACH debit entry. The paper check is not processed.

Electronic network electronic check. A payment that begins as a paper check is converted into, or truncated to, an electronic network entry, using networks such as an ATM network or a credit card network. The paper check is not processed.

Internet- or telephone-initiated payments. A transaction that is initiated over the Internet or via phone, with the debit carried out by an electronic debit, usually an ACH debit. Some users categorize payments initiated via Internet or telephone but that are effected by paper drafts as electronic checks, even though the debit is paper-based.

Catch-all terms used loosely to refer to any attempt to initiate payment through PCs, the Internet, ATMs, POS terminals, and other computer systems.

There are some differences between a check card and a traditional ATM card: A check card has a customer name, account number, an issuing company's logo, a bank's logo, and "Check Card" printed across the front of it. An ATM card has only customer name, account number, and the bank's logo on the front of it. Both cards have magnetic strips on the back for an authorized cardholder to sign on. A check card company, such as Visa, for example, has agreements with banks to issue check cards that look like a Visa credit card. Such a Visa check card can then be used at any retailer that accepts Visa credit cards and at ATMs worldwide.

Like ATM cards, check cards function as debit cards, effectively deducting money more or less directly from a customer's account. Although a traditional ATM card can only be used at an ATM machine (and some grocery stores), customer's can use a check card at any retailer that accepts credit cards. In fact, a check card can be used in the same manner as either a debit card or a credit card: When a customer tells the POS clerk that the card is a credit card, the customer is asked to sign a slip. When a customer tells the POS clerk that the card is a debit card, the customer is asked to enter a PIN number. Either way, the transaction amount is debited directed from the customer's account.

A cardholder makes an electronic withdrawal with a debit card or check card by providing the necessary information by means of a magnetic card reader and keypad of a withdrawal device, an ATM, a POS terminal, or some other withdrawal device. The withdrawal device forwards information to a transaction processor, either a third party vendor of debit processing services, the bank or other institution that issued the card, or the customer's bank. The entity that carries out the transaction processing causes an electronic funds transfer to take place from the customer's bank account to the transaction processor's account. Once the funds are transferred to the transaction processor's bank account, the transaction processor sends an approval code to the withdrawal device authorizing the transaction, for example, a cash withdrawal at an ATM or a sale of goods at a POS terminal. The transaction processor then clears the cardholder's finds into the merchant's bank account through an Automated Clearing House ('ACH') transaction, usually the next bank business day.

An 'account,' as the term is used in this specification, is any demand account offered by any financial institution that supports electronic withdrawals including, for example, checking accounts, savings accounts, money market accounts, NOW accounts, other kinds of interest-bearing and non-interest-bearing demand accounts, and others as will occur to those of skill in the art. A 'financial institution' is any bank, savings association, savings and loan company, credit union, or other institution organized under national or state banking laws capable of offering accounts that support electronic withdrawals. In this specification, such financial institutions are referred to generally as 'drawees.'

Today banks allow a customer to restrict electronic withdrawals according to withdrawal type, Fast Cash, checking, or savings. Banks also support maximum limits on withdrawals from a particular account during a particular period of time. In current methods and systems for electronic withdrawals, however, there is no provision for controlling electronic withdrawals according to drawer location, although it would be an advantage if there were.

SUMMARY OF THE INVENTION

Exemplary methods, systems, and products are disclosed for controlling electronic withdrawals by a withdrawal device that include creating in the withdrawal device a data structure representing a withdrawal request, where the data structure includes fields for a withdrawal device identifier, a drawer identifier, a drawee identifier, and a withdrawal amount; transmitting from the withdrawal device to a drawee a request for limitations on electronic withdrawals for the drawer, where the limitations include a limitation on drawer location; receiving in the withdrawal device from storage in computer memory of the drawee data representing the limitations on electronic withdrawals for the drawer, including the limitation on drawer location; and authorizing, by the withdrawal device, an electronic withdrawal in dependence upon the limitations, including the limitation on drawer location. In typical embodiments, the limitations on electronic withdrawals may include limitations on withdrawal type account, withdrawal period, and maximum withdrawal amount. In typical embodiments, the limitation on drawer location may include a geographic area that includes one or more locations of withdrawal devices.

Typical embodiments include establishing the limitations on electronic withdrawals in the drawee, including the limitation on drawer location, which may be carried out by transmitting to the drawee by an authorized user through electronic data communications one or more of the limitations on electronic withdrawals, including the limitation on drawer location. Typical embodiments include identifying at least one drawer location for the withdrawal device, so that authorizing a withdrawal may be carried out in dependence upon the at least one drawer location for the withdrawal device. Typical embodiments include retrieving from storage in computer memory of the drawee data representing a recorded description of at least one previous withdrawal for the drawer, so that authorizing a withdrawal may be carried out in dependence upon the recorded description of at least one previous withdrawal. In typical embodiments, the data representing limitations on electronic withdrawals include a maximum withdrawal amount, authorizing a withdrawal is carried out in dependence upon the maximum withdrawal amount.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

INTRODUCTION

The present invention is described to some extent in this specification in terms of methods for controlling electronic withdrawals by a withdrawal device. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Controlling Electronic Withdrawals by a Withdrawal Device

Figure 1:
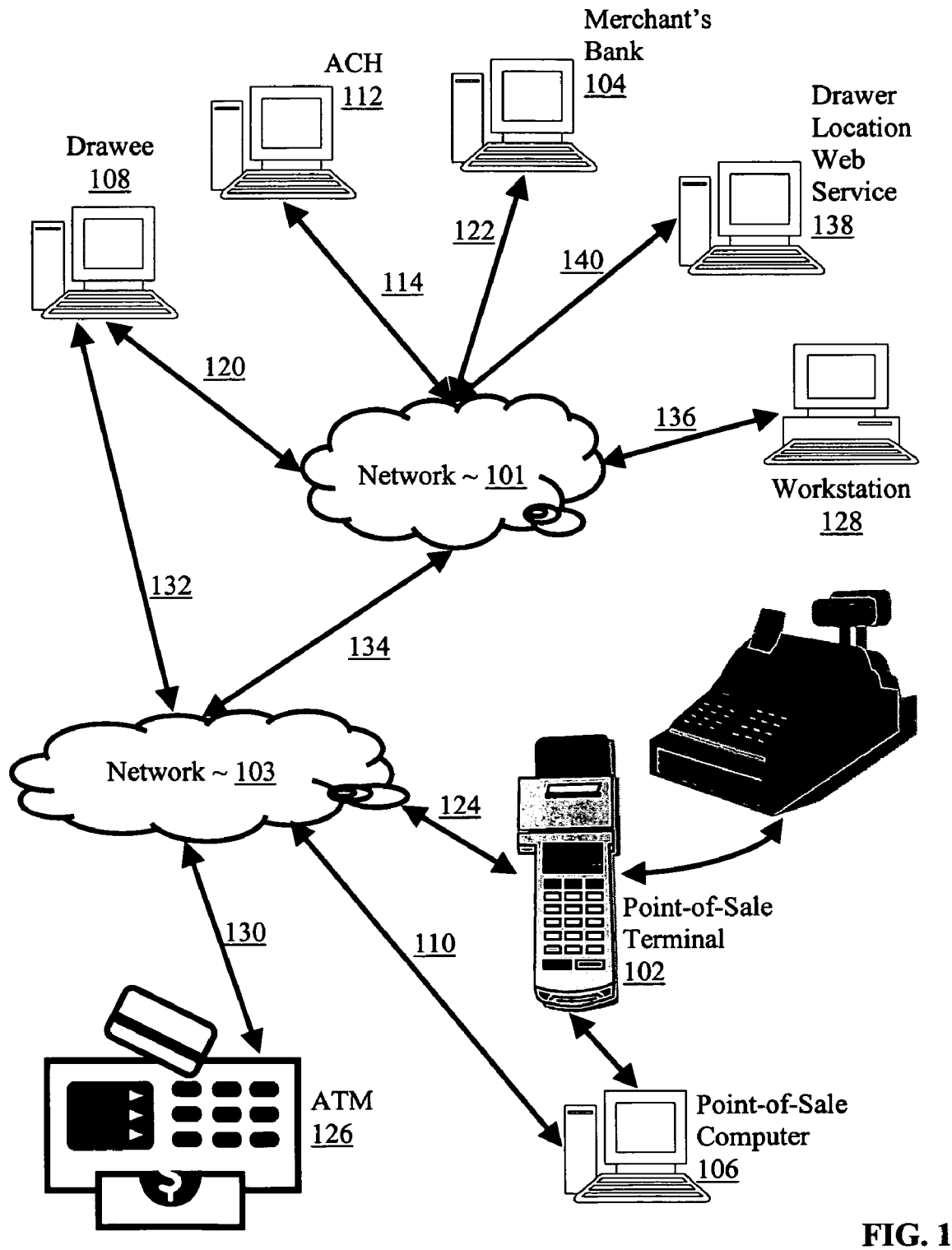
FIG. 1 sets forth a block diagram of an exemplary data processing system for controlling electronic withdrawals by a withdrawal device according to embodiments of the present invention.

Exemplary methods, systems, and products for controlling electronic withdrawals by a withdrawal device according to embodiments of the present invention are described with reference to the accompanying drawings, beginning with FIG. 1. FIG. 1 sets forth a block diagram of an exemplary data processing system for controlling electronic withdrawals by a withdrawal device according to embodiments of the present invention. The system of FIG. 1 is an example of a 'distributed' processing system, a system that includes processing capabilities on several computers connected for data communications through networks.

A network is a data communications system for digital data that operates by communicating data in packets through specialized data communications computers called 'routers.'

An example of such a network is an Internet Protocol or 'IP' network. The example of FIG. 1 includes two networks (101, 103) each of which may be configured as a Local Area Network ('LAN'), or a Wide Area Network ('WAN'), each of which may be coupled with other networks to form a WAN. The network connection aspect of the system of FIG. 1 is only for explanation, not for limitation. In fact, systems for controlling electronic withdrawals by a withdrawal device according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

Systems for controlling electronic withdrawals by a withdrawal device according to embodiments of the present invention operate generally by establishing limitations on electronic withdrawals in a drawee, generally including a limitation on drawer location. Such limitations on electronic withdrawals are then used to authorize electronic withdrawals when requests for withdrawals are received from withdrawal devices. In addition to limitations on drawer location, limitations on electronic withdrawals may include limitations on withdrawal type, account, withdrawal period, and maximum withdrawal amount. In the example of FIG. 1, the limitations on electronic withdrawals are stored in data structures in computer memory of the drawee (108). Exemplary data structures for the storage of limitations on electronic withdrawals, typically including a limitation as to drawer location, are described and discussed generally in this specification as 'location control records.'

Establishing the limitations on electronic withdrawals may be carried out in the system of FIG. 1, for example, by a user, an authorized user of an account, who transmits limitations to a drawee (108) by electronic data communications through network (101) from a workstation (128). Workstation (128) in this example is a computer, a personal computer, a laptop, a Personal Digital Assistant ('PDA'), or others as will occur to those of skill in the art, and the data communications connection (136) from workstation (128) to network (101) may be wired or wireless.

A drawer location is a physical location of a withdrawal device through which a drawer requests an electronic withdrawal. A limitation on drawer location may be a designation of a specific location of a withdrawal device or may be a designation of a geographic area that includes one or more locations of withdrawal devices. That is, a limitation on drawer location is a data encoding of a physical location and can therefore encode more than one physical location at a time. More particularly, a location limitation of '504 Lavaca' may be used to authorize electronic withdrawals from a single ATM located in front of a bank building at 504 Lavaca. And the location limitation 'Las Vegas, Nev.' may be used to authorize electronic withdrawals from the hundreds or thousands of ATMs in Las Vegas.

Examples of withdrawal devices include Automatic Teller Machines ('ATMs') and Point-of-Sale ('POS') terminals. In the example of FIG. 1, withdrawal devices are represented as ATM (126) and POS terminal (102). In some implementations of POS terminals, the terminals themselves are relatively dumb, being made up primarily of user input devices, keypads, magnetic cards readers, and so on, so that the computing resources needed to carry out methods of controlling electronic withdrawals by a withdrawal device according to embodiments of the present invention are included in an associated computer coupled for data communications to one or more POS terminals and represented in FIG. 1 as point-of-sale computer (106). In this specification, therefore, the term 'withdrawal device' includes such associated computers to the extent required to implement any particular system for controlling electronic withdrawals according to embodiments of the present invention.

A 'drawer' is any person authorized to request electronic withdrawals from an account in a drawee. A 'drawee' is any financial institution, bank, savings association, brokerage, or others, that supports electronic withdrawals from accounts in the institution. Authorization to request electronic withdrawals typically is evidenced by possession of a debit card, eCheck card, or ATM card which is swiped through a magnetic card reader on a withdrawal device, thereby providing an electronic form of drawer identification and other data which is in turn included in an electronic request for a withdrawal. Withdrawal devices (126, 102, 106) in the example of FIG. 1 implement a withdrawal request as a data structure in a withdrawal device, and use the data values from the data structure to retrieve limitations on electronic withdrawals from a drawee, drawer location records from a web service, and location withdrawal records from a drawee. In the example of FIG. 1, data communications regarding limitations on electronic withdrawals and location withdrawal records are communicated from withdrawal devices (126, 102, 106) to drawee (108) through network (103), more or less directly (132), or, more circuitously, through networks (103) and (101) by data communications route (134, 120). In the example of FIG. 1, data communications regarding drawer location records are communicated withdrawal devices (126, 102, 106) to drawer location web service (138) through networks (103) and (101) by data communications route (103, 134, 101, 140).

In the system of FIG. 1, a withdrawal device (126, 102, 106) is programmed to create a data structure, referred to as a withdrawal request, that stores data describing a request for a withdrawal or debit against a customer's account. The data describing the request may be input into the withdrawal device by a magnetic card reader of the withdrawal device through which is swiped a debit card, electronic check card, or ATM card, for example. Such data may also be entered through a keyboard, cash register panel, numeric keypad, and in other ways that will occur to those of skill in the art. Examples of data describing a withdrawal request includes a withdrawal type, a withdrawal amount, a drawee identification, and a time stamp.

In the system of FIG. 1, after gathering the data describing a withdrawal request, the withdrawal device operates generally to control electronic withdrawals according to embodiments of the present invention by transmitting from the withdrawal device to a drawee (108) a request for limitations on electronic withdrawals for a drawer, where the limitations include a limitation on drawer location; receiving in the withdrawal device from storage in computer memory of the drawee data representing the limitations on electronic withdrawals for the drawer, including the limitation on drawer location; and authorizing, by the withdrawal device, an electronic withdrawal in dependence upon the limitations, including the limitation on drawer location. A withdrawal device may implement transmitting a request for limitations on electronic withdrawals and receiving limitations on electronic withdrawals by data communications protocols including, for example, HTTP, TCP/IP, and others as will occur to those of skill in the art.

In some systems for controlling electronic withdrawals by a withdrawal device according to embodiments of the present invention, a withdrawal device accepts a withdrawal type code (232 on FIG. 3) as part of a withdrawal request (240 on FIG. 3) so as to support working with a smaller number of location control records than would be represented by all the location control records of a drawer. In such systems, a withdrawal type code received as data input in a withdrawal device and included as part of a withdrawal request is sent to a drawee as part of a request for limitations on electronic withdrawals for a drawer. Such a system may reduce the number of location control records retrieved by retrieving only the location control records for a drawer for a withdrawal type. Such a system may identify a withdrawal type by accepting as input data into a withdrawal request data that includes a designation of withdrawal type. Withdrawal types include, for example, 'Fast Cash,' checking account withdrawals with drawer-entered amounts from ATMs, savings account withdrawals with drawer-entered amounts from ATMs, POS debit withdrawals, POS echeck withdrawals, and so on, as will occur to those of skill in the art.

Consider 'Fast Cash' as an example of withdrawal type for further explanation. 'Fast Cash' is a withdrawal type, typically for ATMs, in which a predetermined amount is withdrawn, thereby increasing transaction efficiency by eliminating the drawer's entry of a withdrawal amount. When drawee (108) receives a request for limitations on electronic withdrawals that includes a withdrawal type code designating the withdrawal type as a Fast Cash withdrawal, then the drawee computer can retrieve from memory only a subset of the limitations for the drawer, that is, the subset that encodes only Fast Cash as withdrawal type—rather than retrieving and returning all the limitations, for example, all the location control records, of the drawer. Such a procedure reduces the data communications burden between the drawee and the withdrawal device, reduces the data processing burden in the withdrawal device which now needs to administer fewer location control records, and thereby increases overall data processing efficiency in the system.

In the example system of FIG. 1, a withdrawal device (126, 102, 106) may operate also to identify a drawer location for a withdrawal device processing a withdrawal request and use the drawer location to authorize a withdrawal. One or more drawer locations, valid or supported by a withdrawal device, may be manufactured into a withdrawal device, such as, for example, into programmable read-only memory of the withdrawal device. Alternatively, one or more drawer locations may be configured into a withdrawal device at installation time, such as, for example, in programmable read-only memory of the withdrawal device.

As mentioned above, however, there is no required one-to-one relationship between a physical location of a withdrawal device and the number of encoded drawer locations that the withdrawal device may serve. One device may server encoded drawer locations of 504 Lavaca Street, the City of Austin, the State of Texas, the southwest region of the United States, the contiguous 48 United States, and so on, all separate, valid drawer locations for the same ATM machine physically located in front a bank at 504 Lavaca Street. Because there is no requirement of a predefined single relationship between a physical location of a withdrawal device and encoded representations of drawer location in systems for controlling electronic withdrawals by a withdrawal device according to embodiments of the present invention, configuring thousands of individual withdrawal devices with millions of drawer locations may be considered disadvantageous.

To reduce the need to configure many withdrawal devices with many, changeable drawer locations, the system of FIG. 1 advantageously provides a remote lookup capability for drawer addresses represented in FIG. 1 as a drawer location web service (138). The drawer location web service (138) is capable of accepting through a web service portal from any withdrawal device a request for drawer locations for the withdrawal device and returning in response a list of valid drawer locations for the withdrawal device—thereby off-loading from withdrawal devices generally any particular need to store their own lists of valid drawer locations. In a system that implements a remote lookup capability as shown in FIG. 1, withdrawal device drawee uses a request/response protocol, HTTP or SOAP (the Simple Object Access Protocol), for example, to query a drawer location web service (138) for the valid drawer locations for the withdrawal device so identified. In doing so, the withdrawal device provides to the web service a withdrawal device identifier unique to the withdrawal device that the web service uses to look up the valid drawer locations for the withdrawal device. The withdrawal device identification code may be manufactured into non-volatile memory of the withdrawal device or configured into non-volatile memory of the withdrawal device upon installation.

In the system of FIG. 1, the drawee (108) typically represents a financial institution that supports at least one account of a drawer from which an amount of an electronic withdrawal is debited in support of a cash withdrawal from a withdrawal device or in support of a POS purchase through a withdrawal device. A merchant owns a withdrawal device and delivers cash, goods, or services to a customer as part of a transaction involving the electronic withdrawal of an amount from a customer's account in drawee (108). The system of FIG. 1 includes the merchant's bank (104) into which a withdrawal device may pay the merchant that owns the withdrawal device through an ACH transaction in an automated clearing house (112), thereby reimbursing the merchant for dispensing cash, goods, or services.

The arrangement of computers and withdrawal devices making up the exemplary system illustrated in FIG. 1 are for explanation, not for limitation. Data processing systems for controlling electronic withdrawals by a withdrawal device according to various embodiments of the present invention may include, for example, servers, routers, client-server architectures, and peer-to-peer architectures, not shown in FIG. 1, as will occur to those of skill in the art. Networks in such data processing systems may support many data communications protocols, including for example TCP/IP, HTTP, WAP, HDTP, electronic banking protocols on private bank networks, and others as will occur to those of skill in the art. Various embodiments of the present invention may be implemented on a variety of hardware platforms in addition to those illustrated in FIG. 1.

Figure 2:
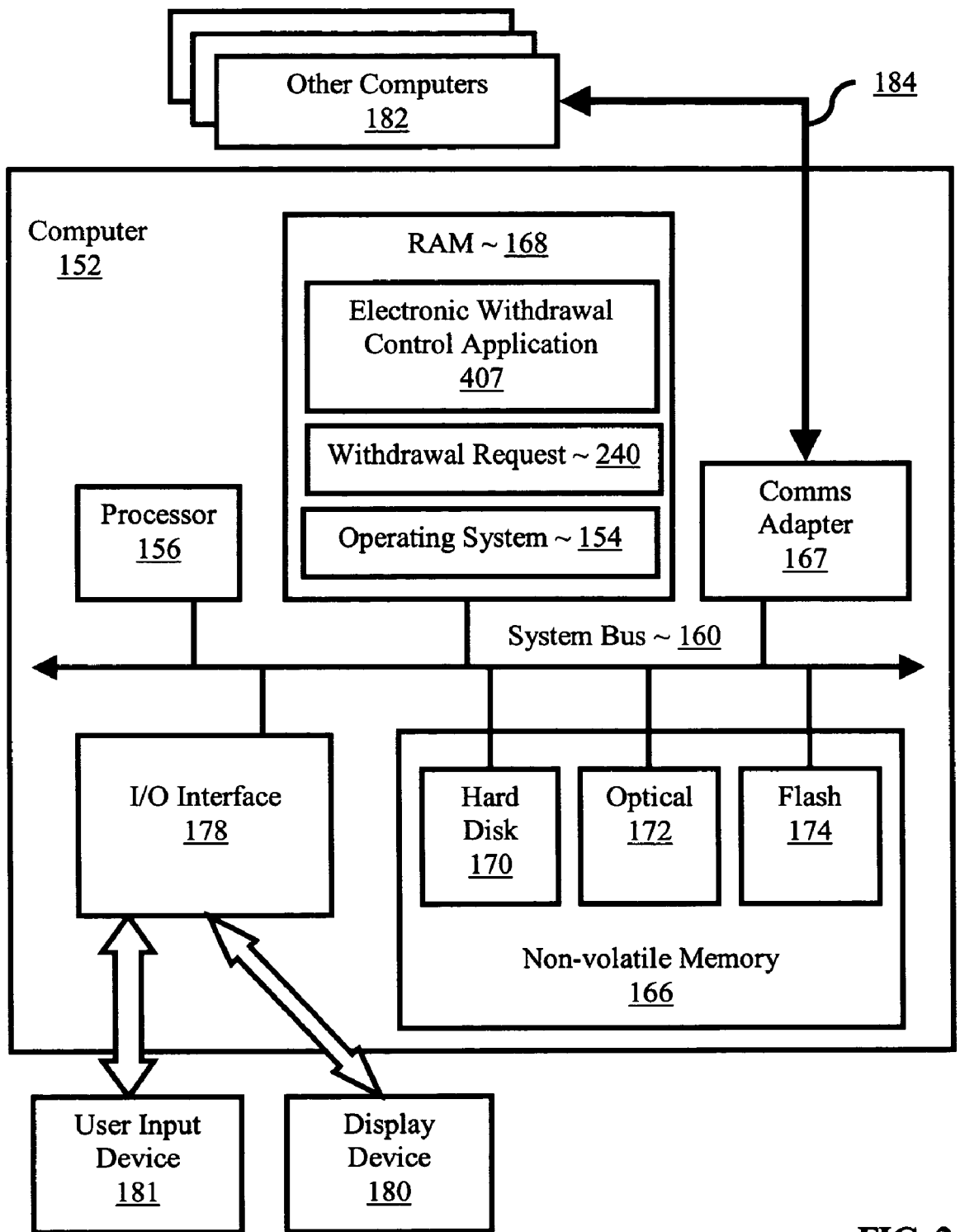
FIG. 2 sets forth a block diagram of automated computing machinery comprising a computer useful in controlling electronic withdrawals by a withdrawal device according to embodiments of the present invention.

Systems for controlling electronic withdrawals by a withdrawal device according to embodiments of the present invention are generally implemented with automated computing machinery, that is, with computers. In the example of FIG. 1, all principal components are represented primarily as computers, including drawee (108), automated clearing house (112), merchant's bank (104), drawer location web service (138), user workstation (128), POS terminal (102), and ATM (126). For further explanation, FIG. 2 sets forth a block diagram of automated computing machinery comprising a computer (152) useful in controlling electronic withdrawals by a withdrawal device according to embodiments of the present invention. The computer (152) of FIG. 2 includes at least one computer processor (156) or 'CPU' as well as random access memory (168) ("RAM"). Stored in RAM (168) is an electronic withdrawal control application (407), an aggregation of computer instructions that carry out steps of controlling electronic withdrawals by a withdrawal device according to embodiments of the present invention. Also stored in RAM is a withdrawal request (240), a data structure representing a request from a drawer for an electronic withdrawal that contains data describing the request, including, for example, withdrawal device identifier, a drawer identifier, a drawee identifier, and a withdrawal amount. Also stored in RAM (168) is an operating system (154). Operating systems useful in computers according to embodiments of the present invention include Unix™, Linux™, AIX™, Microsoft NT™, and many others as will occur to those of skill in the art. In the example of FIG. 2, the electronic withdrawal control application (407) and the operating system (154) are shown in RAM (168), but many components of such software are also stored in non-volatile memory (166).

The computer (152) of FIG. 2 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art.

The exemplary computer (152) of FIG. 2 includes a communications adapter (167) for implementing connections for data communications (184), including connections through networks, to other computers (182), including, for example, drawee computers, withdrawal devices, automated clearing houses, web services portals, and others as will occur to those of skill in the art. Communications adapters implement the hardware level of connections for data communications through which one computer sends data communications another computer, directly or through a network. Examples of communications adapters useful for controlling electronic withdrawals by a withdrawal device according to embodiments of the present invention include modems for wired dial-up connections, Ethernet (IEEE 802.3) adapters for wired network connections, and 802.11b adapters for wireless network connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards, mice, numeric keypads, and magnetic card readers.

Figure 3:
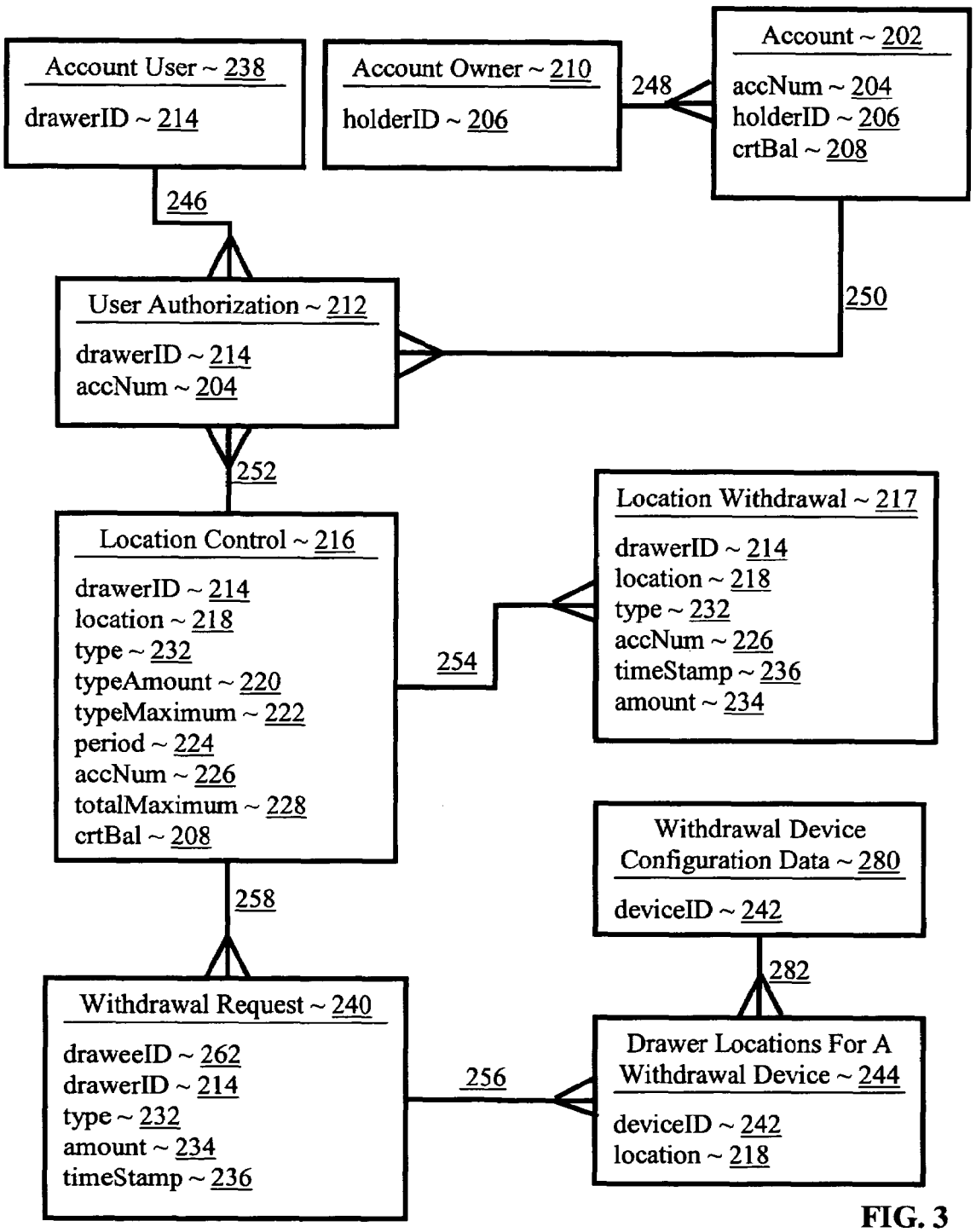
FIG. 3 sets forth a data structure diagram illustrating exemplary data structures and relations among them useful in systems for controlling electronic withdrawals by a withdrawal device according to embodiments of the present invention.

For further explanation, FIG. 3 sets forth a data structure diagram illustrating exemplary data structures and relations among them useful in systems for controlling electronic withdrawals by a withdrawal device according to embodiments of the present invention. The exemplary data structures of FIG. 3 include account records (202), each of which represents an account in a drawee that supports electronic withdrawals. Each account record (202) includes data elements representing an account identification code (204), typically referred to in this specification as an 'account number,' although in fact the account identification code may include text and special characters as well as numbers. Each account record (202) also includes a data element identifying an account holder (206) and a current balance (208). The exemplary data structures of FIG. 3 include account holder records (210), each of which represents a holder of an account, where the account holder records are related one-to-many (248) to the account records (202) through the account holder identifier (206) functioning as a foreign key.

The exemplary data structures of FIG. 3 include account user records (238) each of which represents a person or entity that may be authorized to effect electronic withdrawals from an account. This data structure advantageously distinguishes authorized users from account holders because a single account owner or 'holder,' such as a company or a head of a family, may authorize many persons to make withdrawals from one or more accounts held by the holder. The exemplary data structures of FIG. 3 also include user authorization records (212) each of which represents a single authorization of an account user to make electronic withdrawals from a single account. Each user authorization record (212) includes a drawer identification code (214), a unique identifier for each account user that functions as a foreign key to the account user records (238). Each user authorization record (212) also includes an account number field (204), a foreign key into the account records (202). The one-to-many relation (246) so effected between account user records (238) and user authorization records (212) taken with the one-to-many relation (250) so effected between the account records (202) and the user authorization records (212), taken together, effect a many-to-many relation between account users (238) and accounts (202)—so that an account user may be authorized to make electronic withdrawals from many accounts and an account may have many authorized users.

The exemplary data structures of FIG. 3 include location control records (216), each of which represents, in this example, a set of limitations on electronic withdrawals for a drawer (214) for a location (218). Each location control record (216) includes a drawer field (214) that identifies an account user (238) authorized to make electronic withdrawals from a drawer location. For validating authorization, the drawer field (214) is a foreign key into the user authorization records (212). Each location control record includes a location field (218) that encodes a drawer location. Drawer locations are not limited to a single physical location of a withdrawal device; drawer locations instead are capable of representing geographic areas that include many withdrawal devices.

Each location control record (216) in the example of FIG. 3 includes a withdrawal type field (232) that encodes a limitation of withdrawal type, Fast Cash, Checking, Savings, and so on, as will occur to those of skill in the art. Each location control record (216) in the example of FIG. 3 includes a type amount field (220) that encodes a limitation of a predetermined withdrawal amount for the withdrawal type (232). Not all withdrawal types have corresponding type amounts. Fast Cash, for example, typically does.

Each location control record (216) in the example of FIG. 3 includes an account number (226) that identifies an account from which withdrawals are authorized for the drawer (214) at the drawer location (218) during the withdrawal period (224) for the withdrawal type (232). Each location control record in the example of FIG. 3 also includes a field that encodes a current account balance (208) for the account identified by account number (226). The current account balance is useful in a withdrawal device for determining whether sufficient funds are available for an electronic withdrawal. A drawee, upon receiving a request for limitations on electronic withdrawals for a drawee, may often send a multiplicity of location control records containing the limitations to a withdrawal device for more than one drawer location for more than one account of the drawer. The sufficient funds determination advantageously is made in the withdrawal device, therefore, because the drawee does not know which account will be affected when the drawee transmits the location control records. In such an example, the withdrawal device determines which drawer location is to be used for each transaction and therefore which account and account balance will be used to authorize or deny a request for an electronic withdrawal.

Each location control record (216) in the example of FIG. 3 includes a type maximum field (222) that encodes a limitation of the maximum cumulative amount for the withdrawal type (232) that may be withdrawn during a period of time, a 'withdrawal period,' by the drawer (214) from the drawer location (218). The withdrawal period in this example is provided in field (224) and may be set to a generic period, 'daily,' 'weekly,' 'monthly,' and so on. Alternatively, the withdrawal period (224) may be set to a specific period, such as, for example: Jan. 10-15, 2004. Each location control record (216) in the example of FIG. 3 also includes a total maximum field (228) that encodes a limitation of the maximum cumulative amount for the withdrawal type (232) that may be withdrawn during the withdrawal period from the drawer location for all withdrawal types.

The exemplary data structures of FIG. 3 include location withdrawal records (217) each of which represents a previous electronic withdrawal by a drawer from a drawer location for a withdrawal type during a withdrawal period. In effect, the location withdrawal records make up a kind of location-specific set of debit records. In addition to a drawer identification field (214), a drawer location field (218), a withdrawal type field (232), and an account number (226), each location withdrawal record also includes a time stamp (236) that encodes a date and time of a withdrawal, thereby indicating the relation of a withdrawal to a withdrawal period, and the amount (234) of a withdrawal, which supports determinations of cumulative amounts withdrawn during a withdrawal period.

The exemplary data structures of FIG. 3 include a withdrawal request (240), a data structure that represents a request, received as data input into a withdrawal device, for an electronic withdrawal for a drawer (214) of a withdrawal type (232) in an amount (234). The withdrawal request (240) in this example also includes a drawee identification field (262) that stores a drawee identification for a drawee to which a withdrawal device may transmit a request for limitation on electronic withdrawals. The drawee identification may be implemented as a bank identification number, a data communications network address, a network address and a port number, or otherwise as will occur to those of skill in the art. The withdrawal request (240) in this example also includes a time stamp (236) for use in relating the withdrawal request to a withdrawal period.

The exemplary data structures of FIG. 3 include a table (244) each of whose records represents a valid drawer location (218) for a withdrawal device (242). Each withdrawal device may be physically located in many drawer locations, and many withdrawal devices may be physically located in one drawer location. In this particular example, the withdrawal request records (240) contain no representations of drawer locations for a withdrawal device identified in a device identification field (242) in a withdrawal request. The withdrawal device is therefore left to infer, in dependence upon a withdrawal device identification code, valid drawer locations for the withdrawal device by a lookup in a table such as the one represented at reference (244) on FIG. 3. The data structures of FIG. 3 include a storage location (280, 242) for a withdrawal device identification code, which may be configured into non-volatile computer memory of the withdrawal device when the device is manufactured or when it is installed. Because such a lookup capability, finding drawer locations for a withdrawal device identified by a withdrawal device identification code, is useful to many withdrawal devices, such a table advantageously may be maintained by a third party service and made available to withdrawal devices through a web service such as the one illustrated at reference (138) on FIG. 1.

Figure 4:
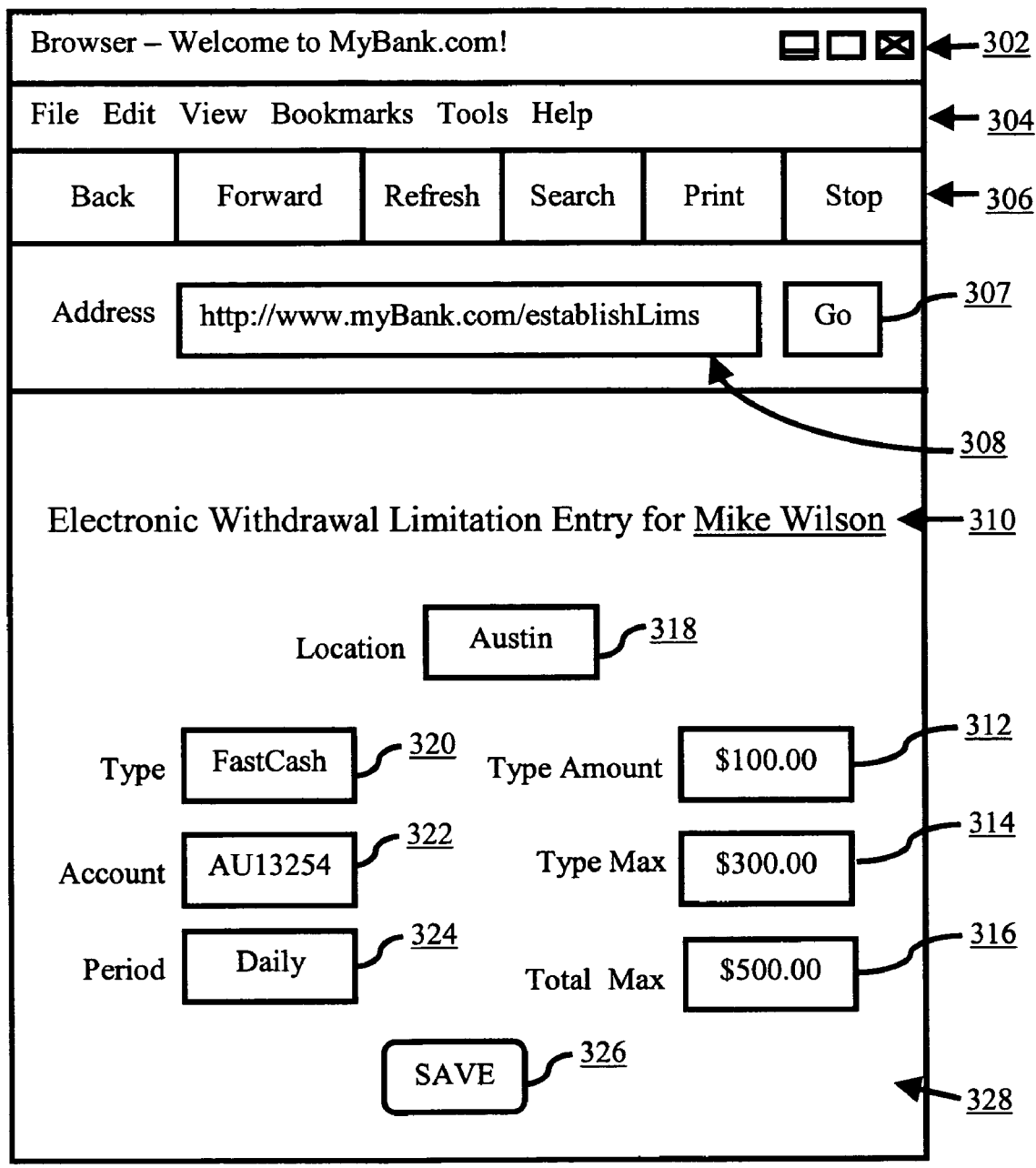
FIG. 4 depicts a GUI of an exemplary software application program, more particularly, in the example of FIG. 4, a browser.

For further explanation, FIG. 4 depicts a graphical user interface ('GUI') of an exemplary software application program, more particularly, in the example of FIG. 4, a browser. 'Browser,' as the term is used in this specification, generally means a web browser, a software application useful for establishing limitations on electronic withdrawals in a drawee in systems for controlling electronic withdrawals by a withdrawal device according to embodiments of the present invention by transmitting to the drawee from an authorized user through electronic data communications limitations on electronic withdrawals. Browsers typically comprise a markup language interpreter, web page display routines, and a HyperText Transport Protocol ('HTTP') communications client. Markup languages interpreted by browsers include the HyperText Markup Language ('HTML'), the eXtensible Markup Language ('XML'), the Wireless Markup Language ('WML') for browsers on wireless web-enabled devices, the Handheld Device Markup Language ('HDML'), and others as will occur to those of skill in the art. Typical browsers today can display text, graphics, audio and video. Browsers are operative in any computer capable of data communications including web-enabled devices, wireless web-enabled devices, microcomputers, PDAs, laptops, and so on. Browsers in wireless web-enabled devices often are downsized browsers called "microbrowsers." The example of FIG. 4 is represented as a browser for convenience of explanation, not for limitation. In fact, many computer application programs may be improved according to embodiments of the present invention for use in establishing limitations on electronic withdrawals, including, for example, word processor programs, spreadsheet programs, database management tools, and, of course, browsers.

The browser of FIG. 4, as depicted, has been operated to point to a web site named "MyBank.com," as shown in the title bar of the browser display (302). The browser of FIG. 4 includes a GUI toolbar (306) with a Back button, a Forward button, and buttons for refreshing the display, searching, printing, and stopping web page retrievals. The browser of FIG. 4 also includes a horizontal menu (304) containing the menu items File, Edit, View, Bookmark (called 'Favorites' on some browsers), Tools, and Help. The exemplary browser of FIG. 4 includes an address bar (308), and invoking the Universal Resource Locator ('URL') identifying the displayed web page may be carried out by entering the URL in a browser's address bar (308) and invoking the browser's Go button (307) next to the address bar (308) with a mouseclick or keyboard carriage return.

The browser of FIG. 4 has been further navigated to a web page at the network address represented by the URL: http://www.myBank.com/establishLims. Accessing this web page required a logon with user identification and a password. In this example, the logon process identified an authorized user named "Mike Wilson." The web page so accessed is a data entry form displayed in the web page display area (328) of the browser of FIG. 4. The data entry form includes data entry fields for limitations on electronic withdrawals for drawer Mike Wilson (310) at a location (318) designated as "Austin." The limitations on electronic withdrawal for drawer Mike Wilson for location Austin include a withdrawal type (320) set to "Fast Cash"; a type amount (312), that is, in this example, a Fast Cash withdrawal amount, set to "$100.00"; an account limitation (322) set to account number "AU13254"; a type maximum (314), that is, in this example, a maximum for Fast Cash for a period of time, set to "$300.00"; a period limitation (324) set to "Daily"; and a total maximum for the period (316) set to "$500.00."

Figure 5:
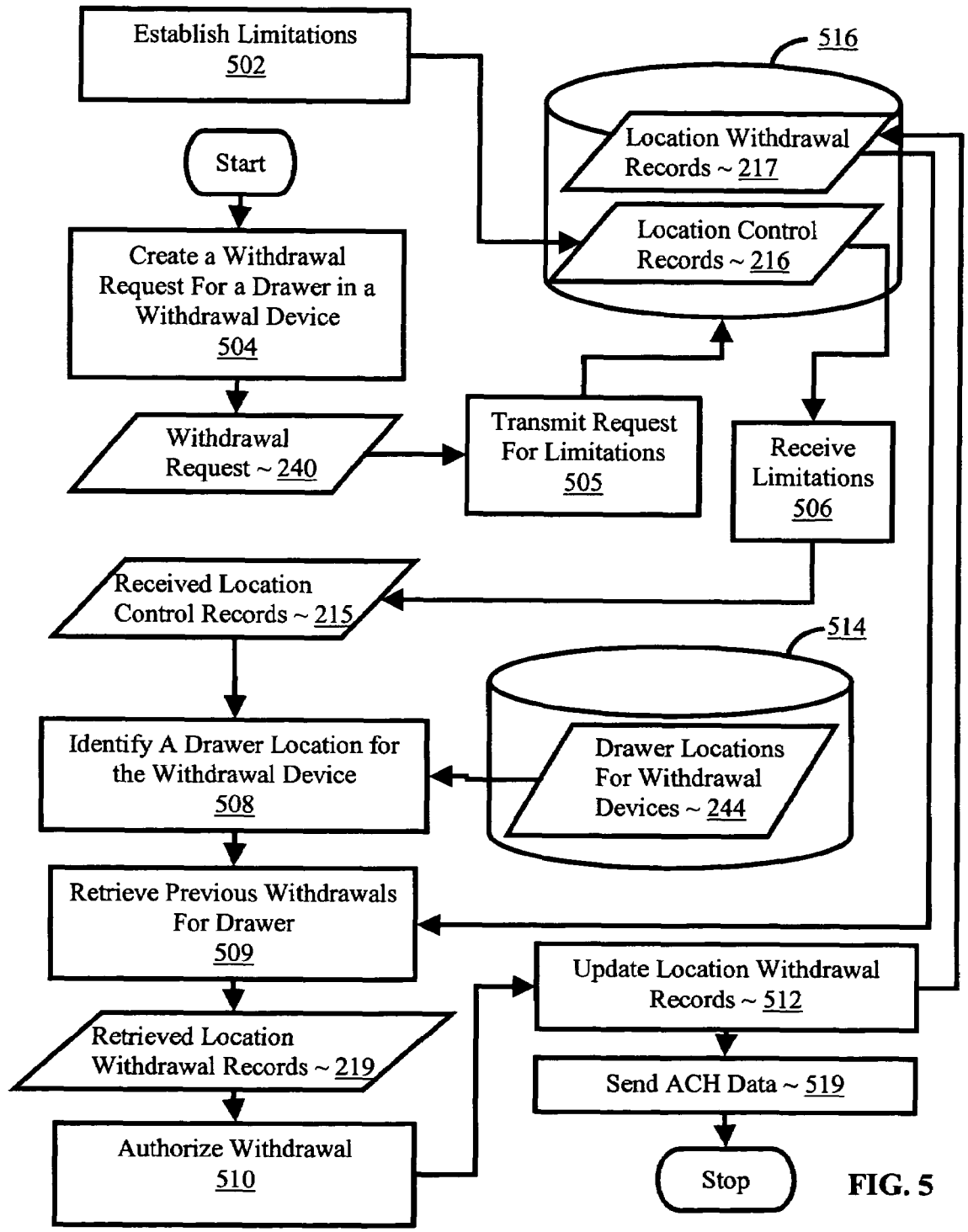
FIG. 5 sets forth a flow chart illustrating an exemplary method for controlling electronic withdrawals by a withdrawal device according to embodiments of the present invention.

A user may operate the SAVE button (326) to transmit the illustrated limitations on electronic withdrawal to the drawee 'MyBank,' thereby establishing limitations on electronic withdrawals in a drawee in a system for controlling electronic withdrawals by a withdrawal device according to embodiments of the present invention by transmitting to the drawee from an authorized user through electronic data communications limitations on electronic withdrawals. In this example, the limitations so established control Fast Cash withdrawals from the location 'Austin' for drawer 'Mike Wilson.' Mike Wilson is permitted by the illustrated limitations on electronic withdrawals to withdraw from any ATM or POS terminal in the city of Austin $100.00 of Fast Cash per withdrawal, provided that Mike Wilson's Fast Cash withdrawals from within Austin do not exceed $300.00 daily and Mike Wilson's total withdrawals of all withdrawal types including Fast Cash do not exceed $500.00 daily. For further explanation, FIG. 5 sets forth a flow chart illustrating an exemplary method for controlling electronic withdrawals by a withdrawal device according to embodiments of the present invention. The method of FIG. 5 is explained with reference both to FIG. 5 and also to the exemplary data structures of FIG. 3. The method of FIG. 5 includes establishing (502) the limitations on electronic withdrawals in the drawee, including the limitation on drawer location, which may be carried out as described above by transmitting to the drawee by an authorized user through electronic data communications one or more of the limitations on electronic withdrawals, including the limitation on drawer location. In the method of FIG. 5, the limitations on electronic withdrawals are described as location control records (216) and may include limitations on withdrawal type (232 on FIG. 3), drawer (214), account (224), withdrawal period (226), and maximum withdrawal amount (222, 228). In the method of FIG. 5, a limitation on drawer location (218 on FIG. 3) may be represented as a geographic area that includes one or more locations of withdrawal devices.

The method of FIG. 5 includes creating (504) a withdrawal request (240) in a withdrawal device. The method of FIG. 5 is carried out in a withdrawal device (not shown on FIG. 5), that is, in a POS terminal or ATM, for example. In the method of FIG. 5, creating (504) a withdrawal request is carried out by receiving in a withdrawal device through a user input device data describing a request for an electronic withdrawal. Examples of such data input devices include keyboards, mice, numeric keypads, and magnetic card readers. The data elements describing a withdrawal request (240 on FIG. 3) may include a withdrawal device identifier (242), a drawer identifier (214), a withdrawal amount (234), and a drawee identifier (262). As explained earlier, the withdrawal request may optionally also include a withdrawal type (232 on FIG. 3).

The method of FIG. 5 also includes transmitting (505) from a withdrawal device to a drawee a request for limitations on electronic withdrawals for the drawer, wherein the limitations include a limitation on drawer location. In the example of FIG. 5, the transmission of a request for limitation on electronic withdrawals is illustrated as directed ultimately to the computer memory (516) of a drawee. The drawee is identified in a drawee identification field (262 on FIG. 3) in a withdrawal request (240), and transmitting (505) a request for limitations on electronic withdrawals to a drawee is carried out by transmitting the request to the drawee identified in the drawee identification field of the withdrawal request.

The method of FIG. 5 also includes receiving (506) in a withdrawal device from storage in computer memory (516) of a drawee data representing the limitations (216) on electronic withdrawals for the drawer, including the limitation on drawer location. The limitations on electronic withdrawals as retrieved may be organized in location control records such as the one illustrated at reference (216) on FIG. 3, and receiving data representing limitations on electronic withdrawals is described in this example as receiving location control records. Receiving location control records is carried out by receiving location control records of the drawer, that is, location control records (216 on FIG. 3) having a drawer identification field (214) set to the same value as a drawer identification field on the withdrawal request (240).

Receiving (506) location control records of a drawer often will include receiving more than one location control record because a drawer often will establish several or many sets of limitations on withdrawals for the drawer, for the same drawer location or for more than one drawer location. In addition to varying according to drawer location, each drawer's established limitations on electronic withdrawals also may be varied by a drawer according to withdrawal period, the account to be used for each withdrawal, maximum amount for withdrawal of a type, maximum amount for all withdrawals for a period, and so on.

The retrieving process may be made more selective by including a withdrawal type in the process, so that instead of retrieving all location control records for a drawer, the retrieving process retrieves only a subset of the location control records for a drawer, that is, the subset associated with the withdrawal type. If the withdrawal type is Fast Cash, for example, such a retrieval process, instead of retrieving all the location control records for the drawer, retrieves only the drawer's location control records having a type field set to 'Fast Cash.' Other ways of fine tuning the retrieval process will occur to those of skill in the art, and all such ways are well within the scope of the present invention.

The method of FIG. 5 also includes identifying (508) at least one drawer location for the withdrawal device for use in determining whether to authorize an electronic withdrawal. In the example of FIG. 5, the withdrawal request (240) arrived bearing no indication of valid drawer locations for the withdrawal device. Identifying (508) at least one drawer location for the withdrawal device therefore is carried out by retrieving from a data store (514) drawer location records for the withdrawal device, by using the withdrawal device identifier (242 on FIG. 3) from the withdrawal request as an index into records (244 on both FIG. 3 and FIG. 5) of drawer locations for withdrawal devices, and comparing retrieved records representing valid drawer locations for the withdrawal device with the retrieved location control records (215) for the drawer.

For further explanation, consider an example in which the step of retrieving (506) location control records for a drawer retrieves three location control records which have drawer location values (240, 218 on FIG. 3) of:
Las Vegas, Nev.
Austin, Tex.
Chicago, Ill.
In the same example, three records representing valid drawer locations for the withdrawal device identified in the pertinent withdrawal request are retrieved remotely from store (514) having drawer location values (244, 218 on FIG. 3) of:
Texas
Austin, Tex.
504 Lavaca Street, Austin, Tex.
In this example, identifying (508) at least one drawer location for the withdrawal device is carried out by comparing retrieved records representing valid drawer locations for the withdrawal device with the retrieved location control records for the drawer, that is, comparing the respective drawer location values in the records for a match, which in this case results in identifying 'Austin, Tex.' as the drawer location for the withdrawal.

In addition, in this example, where multiple retrieved location control records for the drawer represent more than one drawer location, identifying the drawer location for the withdrawal device also identifies the location control record that contains the limitations on electronic withdrawals that govern the current withdrawal request. That is, in this example, the location control record that contains the limitations on electronic withdrawals that govern the subject withdrawal request is the retrieved location control record (215) for the drawer identified in the withdrawal request (240, 214 on FIG. 3) with its drawer location field (216, 218 on FIG. 3) set to 'Austin, Texas.'

The method of FIG. 5 also includes retrieving (509) from storage in computer memory of the drawee data representing a recorded description (217) of at least one previous withdrawal for the drawer for use in determining whether to authorize an electronic withdrawal. Records of previous withdrawals may be represented by location withdrawal records as illustrated at reference (217) on FIG. 3. Each location withdrawal record (217) represents a previous electronic withdrawal by a drawer from a drawer location for a withdrawal type during a withdrawal period. Each location withdrawal record stores data elements describing drawer identification (214), drawer location (218) for a previous withdrawal, withdrawal type (232), an account number (226), a time stamp (236) for the previous withdrawal that can be used to determine the relation of a previous withdrawal to a withdrawal period, and the amount (234) of a previous withdrawal for use in determining cumulative amounts withdrawn during a withdrawal period. Retrieving (508) data representing a recorded description of previous withdrawals can be carried out by retrieving from a table of location withdrawal records a set of location withdrawal records whose drawer identification field values (217, 214 on FIG. 3) match the drawer identification from a received withdrawal request (240) and whose drawer location field values (217, 218 on FIG. 3) match the drawer location of the withdrawal device identified in the withdrawal request.

The method of FIG. 5 includes authorizing (510) by a withdrawal device an electronic withdrawal in dependence upon limitations on electronic withdrawals (219), including a limitation on drawer location (218 on FIG. 3). After a withdrawal is authorized, the method of FIG. 5, includes updating (512) the location withdrawal records of a drawee institution, carried out through electronic message exchange with the drawee, so that the location withdrawal records will include data describing the current transaction for use in processing future transactions. The method of FIG. 5 also includes sending (519) ACH data to an automated clearing house (112 on FIG. 1) to pay a merchant, the owner of the withdrawal device used in the current transaction, an ATM or POS terminal, for example.

As mentioned, the method of FIG. 5 includes authorizing (510) an electronic withdrawal by a withdrawal device. For further explanation, FIG. 6 sets forth a flow chart illustrating an exemplary method of authorizing an electronic withdrawal by a withdrawal device that includes adding (604) the withdrawal amount from the current withdrawal request (240, 234 on FIG. 3), to all the amounts of previous withdrawals for the drawer location, withdrawal period, and withdrawal type. The amounts of previous withdrawals for the drawer location, withdrawal period, and withdrawal type are obtained through a query against location withdrawal records (219) for which the drawer location (216, 218 on FIG. 3), withdrawal period (224), and withdrawal type (232) are taken from the governing location control record (215). The governing location control record (215) is the location control record that contains the limitations on electronic withdrawals that govern the current withdrawal request—identified as described above in the discussion of the method of FIG. 5.

Figure 6:
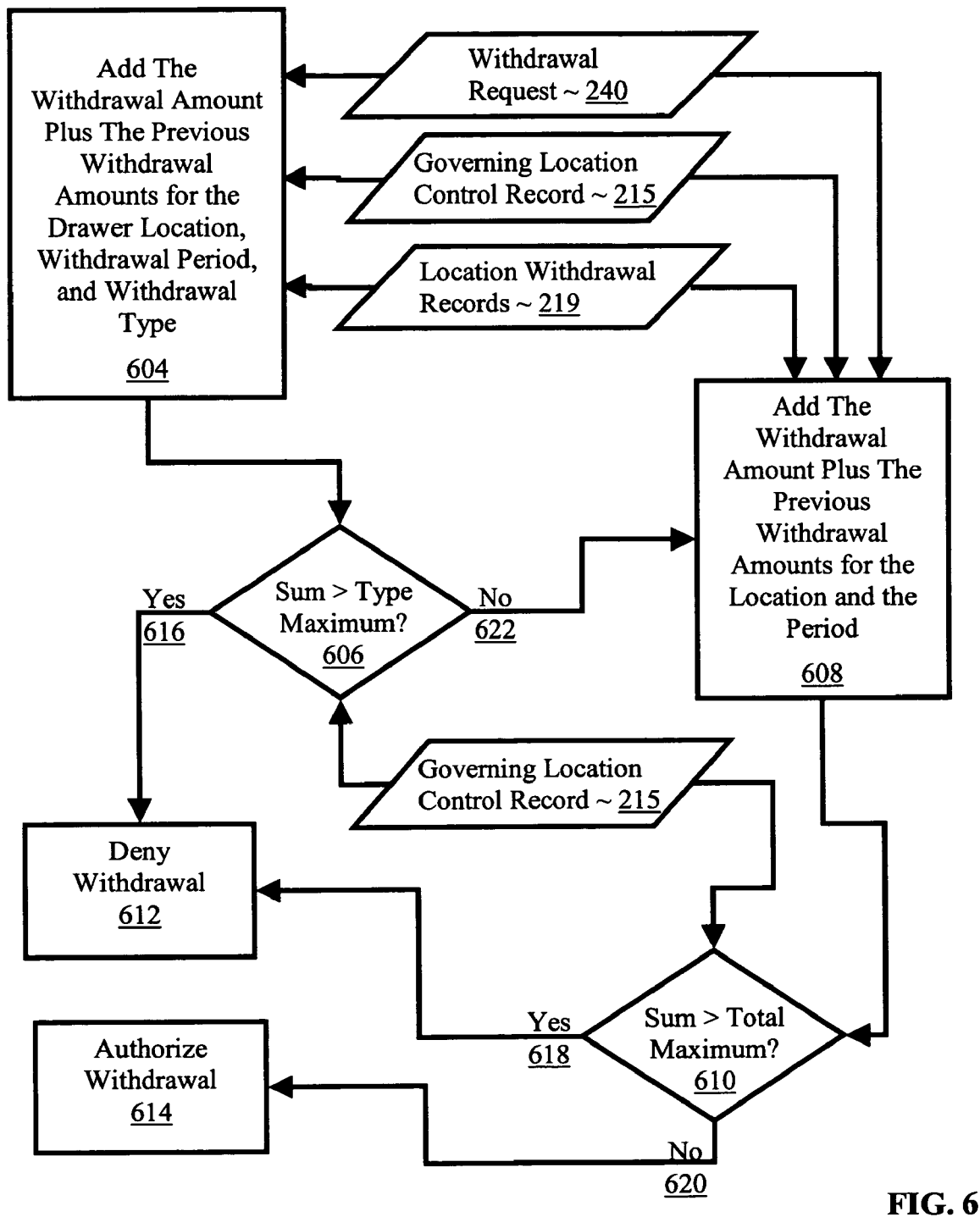
FIG. 6 sets forth a flow chart illustrating an exemplary method of authorizing an electronic withdrawal according to embodiments of the present invention.

The method of FIG. 6 includes comparing (606) by the withdrawal device the sum of the withdrawal amount from the current withdrawal request and the amounts of previous withdrawals for the drawer location, period, and type to the type maximum (216, 222 on FIG. 3) from the governing location control record (215). If the sum of the currently requested withdrawal amount and the amounts of previous withdrawals for the drawer location, period, and type exceeds the type maximum (616), the withdrawal request is denied (612).

If the sum of the current requested withdrawal amount and the amounts of previous withdrawals for the drawer location, period, and type does not exceed the type maximum (622), the method of FIG. 6 also includes adding (608) the withdrawal amount, taken from the withdrawal request (240, 234 on FIG. 3), to all the amounts of previous withdrawals for the drawer location and withdrawal period. The amounts of previous withdrawals for the drawer location and withdrawal period are obtained through a query against location withdrawal records (219) for which the drawer location (216, 218 on FIG. 3) and withdrawal period (224) are taken from the governing location control record (215).

The method of FIG. 6 includes comparing (610) by the withdrawal device the sum of the withdrawal amount from the current withdrawal request and the amounts of previous withdrawals for the drawer location and withdrawal period to the total maximum limitation (216, 228 on FIG. 3) on electronic withdrawals for the drawer for the drawer location. The value of the total maximum limitation is taken from the governing location control record (215). If the sum of the currently requested withdrawal amount and the amounts of previous withdrawals for the drawer location and withdrawal period exceeds the total type maximum (618), the withdrawal request is denied (612). If the sum of the current requested withdrawal amount and the amounts of previous withdrawals for the drawer location and withdrawal period does not exceed the type maximum (620), in the method of FIG. 5, an electronic withdrawal is authorized (614).

Figure 7:
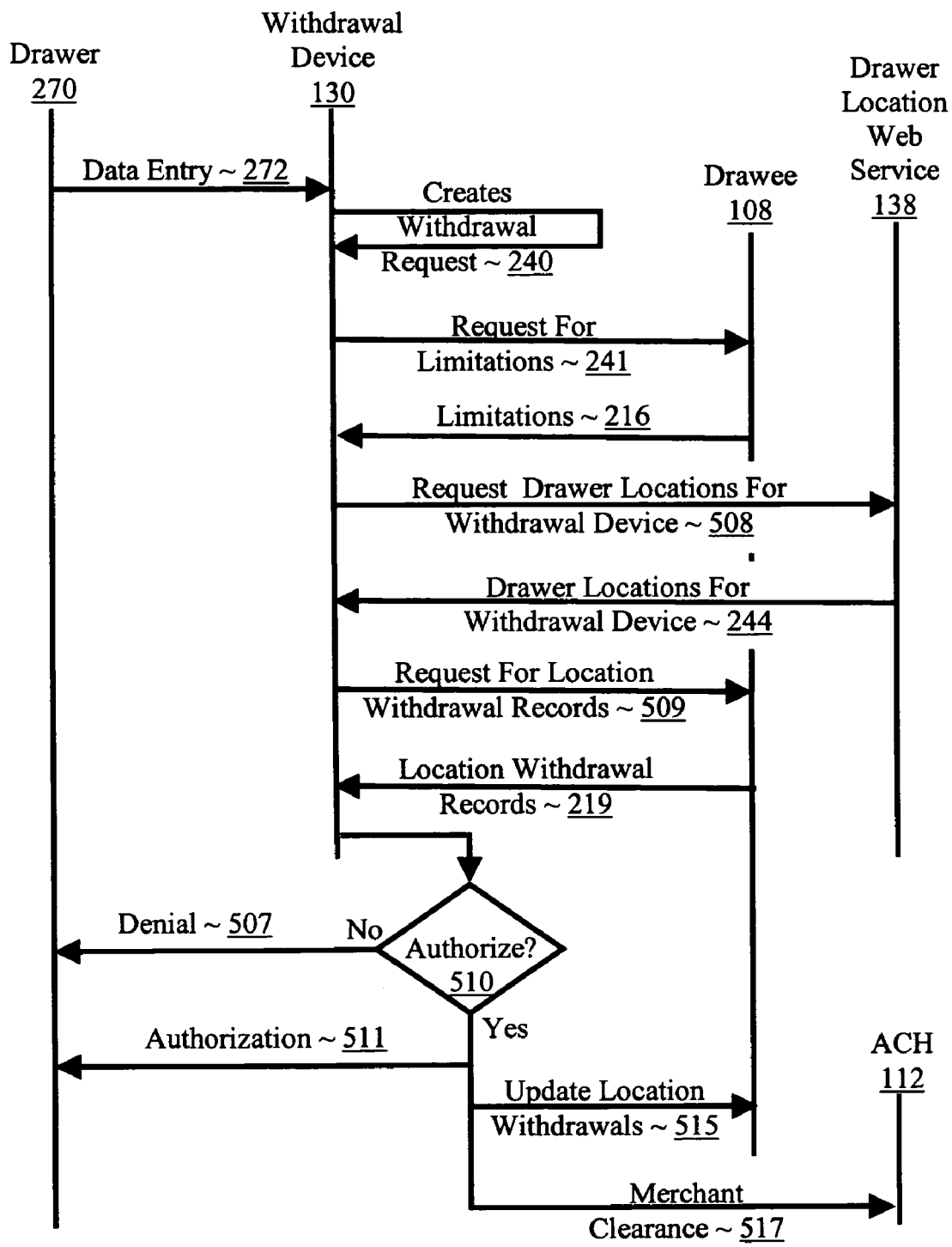
FIG. 7 sets forth a message sequence diagram illustrating a method for controlling electronic withdrawals by a withdrawal device in a distributed data processing system according to embodiments of the present invention.

Controlling electronic withdrawals by a withdrawal device according to embodiments of the present invention is further explained with reference to FIG. 7. FIG. 7 sets forth a message sequence diagram illustrating a method for controlling electronic withdrawals by a withdrawal device in a distributed data processing system according to embodiments of the present invention. In FIG. 7, vertical line (270) represents a drawer, and vertical lines (130, 108, and 138) represent computers coupled for electronic data communications through at least one network. Horizontal lines (272, 240, 241, 216, and so on) in FIG. 7 represent electronic data entry (272) or electronic data communications, message traffic in the network. In the example of FIG. 7, a drawer (270) enters (272) into withdrawal device (130) a withdrawal request (240), that is, data described a request for an electronic withdrawal. The withdrawal request may include a withdrawal device identifier, a drawer identifier, a drawee identifier, and a withdrawal amount as described above. The withdrawal device creates a withdrawal request by gathering the entered data into a data structure in computer memory of the withdrawal device. The withdrawal request represents a request from a customer, a drawer, for an electronic withdrawal from the customer's bank, a drawee.

In the example of FIG. 7, the withdrawal device (130) transmits to the drawee (108) a request (241) for limitations on electronic withdrawals for the drawer; the limitations include a limitation on drawer location. The drawee (108) returns to the withdrawal device (130) the limitations (216) from storage in computer memory of the drawee. The limitations are data representing limitations on electronic withdrawals for the drawer, and they include a limitation on drawer location (218 on FIG. 3).

The withdrawal device in this example requests (508) and receives (244) from drawer location web service (138) a list of valid drawer locations for the withdrawal device (126). The withdrawal device compares the valid drawer locations in the list with the drawer locations in the limitations until it finds a match between a drawer location in a location control record and a drawer location in the list of valid drawer locations. The withdrawal device reads the account number from the matching location control record, and, now knowing for the first time in this transaction both the account number pertinent to the current transaction and the drawer location for the transaction, the withdrawal device requests (509) and receives (219) from the drawee (108) the location withdrawal records (219 on FIGS. 5 and 6) for the drawer, the drawer location, and the account number.

The withdrawal device then determines (510) whether to authorize an electronic withdrawal in dependence upon the limitations, including the limitation on drawer location. The determination may be made, for example, as described above in the method of FIG. 6. If the withdrawal device (130) determines that the electronic withdrawal is to be denied, the withdrawal device displays a denial message (507) to the drawer (270). If the withdrawal device determines that the electronic withdrawal is to be authorized, the withdrawal device (130) notifies (511) the drawer and carries out the transaction by, for example, dispensing cash if the withdrawal device is an ATM or communicating an authorization message to an electronic cash register if the withdrawal device is a POS terminal. In addition, upon authorization, the withdrawal device (130) sends to the drawee (108) a message (515) updating the drawee's location withdrawal records and also sends a message (517) to an automated clearing house (112) to pay the merchant that owns the withdrawal device (126).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for controlling electronic withdrawals by a withdrawal device, the method comprising:
   creating in the withdrawal device a data structure representing a withdrawal request, wherein the data structure includes fields for a withdrawal device identifier, a drawer identifier, a drawee identifier, and a withdrawal amount;
   transmitting from the withdrawal device to a drawee a request for limitations on electronic withdrawals for the drawer, wherein the limitations include a limitation on drawer location;
   receiving in the withdrawal device from storage in computer memory of the drawee data representing the limitations on electronic withdrawals for the drawer, including the limitation on drawer location; and
   authorizing, by the withdrawal device, an electronic withdrawal in dependence upon the limitations, including the limitation on drawer location.

2. The method of claim 1 wherein the limitations on electronic withdrawals further comprise limitations on withdrawal type, drawer, account, withdrawal period, and maximum withdrawal amount.

3. The method of claim 1 wherein the limitation on drawer location further comprises a geographic area that includes one or more locations of withdrawal devices.

4. The method of claim 1 further comprising establishing the limitations on electronic withdrawals in the drawee, including the limitation on drawer location.

5. The method of claim 4 wherein establishing the limitations on electronic withdrawals further comprises transmitting to the drawee by an authorized user through electronic data communications one or more of the limitations on electronic withdrawals, including the limitation on drawer location.

6. The method of claim 1 further comprising:
   identifying at least one drawer location for the withdrawal device,
   wherein authorizing a withdrawal further comprises authorizing a withdrawal in dependence upon the at least one drawer location for the withdrawal device.

7. The method of claim 1 further comprising:
   retrieving from storage in computer memory of the drawee data representing a recorded description of at least one previous withdrawal for the drawer,
   wherein authorizing a withdrawal further comprises authorizing a withdrawal in dependence upon the recorded description of at least one previous withdrawal.

8. The method of claim 1 wherein:
   the data representing limitations on electronic withdrawals include a maximum withdrawal amount; and
   authorizing a withdrawal further comprises authorizing a withdrawal in dependence upon the maximum withdrawal amount.

* * * * *